United States Patent
Atsavapranee et al.

(10) Patent No.: US 7,196,777 B1
(45) Date of Patent: Mar. 27, 2007

(54) GLOBAL LASER RANGEFINDER PROFILOMETRY

(75) Inventors: Paisan Atsavapranee, Cabin John, MD (US); Jerry W. Shan, Raritan, NJ (US)

(73) Assignee: The United States of America as represented by the Secretary of the Navy, Washington, DC (US)

( * ) Notice: Subject to any disclaimer, the term of this patent is extended or adjusted under 35 U.S.C. 154(b) by 280 days.

(21) Appl. No.: 10/932,648

(22) Filed: Sep. 2, 2004

Related U.S. Application Data

(60) Provisional application No. 60/500,235, filed on Sep. 5, 2003.

(51) Int. Cl.
*G01C 3/08* (2006.01)

(52) U.S. Cl. .................. 356/4.01; 356/4.02; 356/4.03; 356/5.01

(58) Field of Classification Search ............... 356/4.01
See application file for complete search history.

(56) References Cited

U.S. PATENT DOCUMENTS 4,888,490 A * 12/1989 Bass et al. ............. 250/559.16
4,948,258 A * 8/1990 Caimi ....................... 356/603
2004/0156033 A1 * 8/2004 Kanemitsu ................. 356/3.01

OTHER PUBLICATIONS

U.S. Appl. No. 60/500,235, filed Sep. 5, 2003, invention entitled-"Global Laser Ranger Profilometry," joint inventors Paisan Atsavapranee and Jerry W. Shan.

* cited by examiner

*Primary Examiner*—Thomas H. Tarcza
*Assistant Examiner*—Luke D. Ratcliffe
(74) *Attorney, Agent, or Firm*—Howard Kaiser

(57) ABSTRACT

Two light beams from respective light-emitting devices (e.g., lasers or lamps) cross each other and strike a surface (e.g., of a fluid) at respective oblique orientations relative to the surface (e.g., oblique but nearly vertical orientations that are equal and opposite to each other). A camera captures the surface scattering of the beams in a photographic "double-beam" image containing two respective photographic forms corresponding to the two respective surface scattering locations. The measured distance between the two photographic forms is trigonometrically indicative of the height and slope of the surface in the vicinity of the two surface scattering locations. Some inventive embodiments effect "single-beam" images that are trigonometrically indicative of height only. Plural (e.g., numerous) individual or paired light-emitting devices can be arranged so that a camera snaps an instantaneous photograph containing corresponding forms that are mathematically informative of a surface's configuration at plural (e.g., numerous) locations.

21 Claims, 10 Drawing Sheets

GLOBAL LASER RANGEFINDER PROFILOMETRY

CROSS-REFERENCE TO RELATED APPLICATIONS

This application claims the benefit of U.S. provisional application No. 60/500,235, filed 5 Sep. 2003, hereby incorporated herein by reference, entitled "Global Laser Rangefinder Profilometry," joint inventors Paisan Atsavapranee and Jerry W. Shan.

STATEMENT OF GOVERNMENT INTEREST

The invention described herein may be manufactured and used by or for the Government of the United States of America for governmental purposes without the payment of any royalties thereon or therefor.

BACKGROUND OF THE INVENTION

The present invention relates to interfaces between solids and fluids or between two kinds of fluids, more particularly to methods and apparatuses for performing measurements relating to surface waves described by such interfaces.

Seakeeping characteristics of a surface ship are of the utmost concern to the designer of the marine vessel, whether it be a naval combatant, a commercial cargo ship or a pleasure cruise liner. A common paradigm in the design process involves the usage of computational fluid dynamics (CFD) techniques to compute the influence of surface waves on the motion of the ship in different sea states. The surface wave input to the ship motion calculation can be from an assumed wave spectrum, or from a solution of a CFD computation, or from a measured wave based on a physical experiment. Experimental measurement of surface waves is thus important either as a direct input to the computation of the ship motion or as a verification of the accuracy of CFD computation of the surface wave field.

Many measurement techniques, such as sonic probes and finger probes, have been employed to measure surface wave elevation at a few discrete locations. However, to date no technique exists that would allow the instantaneous measurement of the surface wave field at a large array of points around a ship model. In order to use discrete point measurements as input to the ship motion calculation, certain assumptions need to be made regarding the spatial uniformity of the wave field. The validity of these assumptions depends highly on the complexity of the wave field and can therefore put the results into question. Simultaneous field measurements of the surface waves taken at a large array of points, and covering a large physical area, would be more suitable—both for the purpose of providing a direct input to the ship motion calculation and for the purpose of validating a CFD computation of a wave field.

SUMMARY OF THE INVENTION

In view of the foregoing, it is an object of the present invention to provide a surface wave measurement methodology that permits instantaneous measurement of a relatively large number, as compared with conventional wave measurement methodologies, of discrete points describing a surface wave field.

It is a further object of the present invention to provide a surface wave measurement methodology that permits instantaneous measurement of a relatively large area, as compared with conventional wave measurement methodologies, of a surface wave field.

The present invention's "Global Laser Rangefinder Profilometry" (acronymously referred to by the inventors as "GLRP") represents a novel optical methodology and technique for rendering instantaneous field measurement of surface waves. The inventive GLRP surface measurement system enables optical mapping of a distinct liquid/air interface or a solid/air interface. The inventive GLRP surface profiling system, when effected in conjunction with proper treatment of the measured surface, allows for instantaneous multi-point measurement of the shape of the surface of interest. Although the inventive GLRP surface measurement system can be used in a wide range of applications, it was first developed by the inventors for the purpose of measuring a surface wave field around a model-scale naval combatant in different sea states.

The principle of the present invention's GLRP is somewhat analogous to that of a conventional laser rangefinder using triangulation. A conventional laser rangefinder projects a beam of visible laser light to create a spot on a target surface. Scattered light from the surface (e.g., light that has been deflected, or light that has been absorbed and re-emitted) is viewed at an angle by a line-scan detector, and the target's distance is computed from the image pixel data. The inventive GLRP is similar insofar as a beam of visible laser light is projected upon a surface, and light that is scattered from the surface (e.g., light that has been deflected, or light that has been absorbed and re-emitted) is viewed using a device; however, the inventive GLRP avails itself of different geometric principles and uniquely implements a photographic device such as a digital camera for detection purposes. The term "scattering," as used herein in relation to light, broadly refers to the diffusion or redirection, in any manner, of light energy that encounters particles. Scattering of light can occur, for instance, at or near the interface between two mediums (e.g., either at the surface of, or inside, the medium containing particles associated with the scattering). Scattering of light can be associated with any of various physical processes, including (i) reflection (deflection) of light, and/or (ii) absorption and reemission of light (such as exemplified by flurorescence).

In accordance with typical inventive embodiments, a method for determining at least one configurative characteristic of a surface comprises emitting at least one light beam, generating a photographic image, measuring at least one separation, and calculating at least one distance. Each light beam is disposed at an oblique angle with respect to a geometric normal to the geometric plane generally defined by the surface. Each light beam is scattered by the surface at a corresponding surface location. The photographic image contains at least one photographic form. Each photographic form is associated with the scattering by the surface of a corresponding light beam. Each separation is between a photographic form and a corresponding photographic reference location in the photographic image. Each distance is between a surface location and a corresponding geometric reference location in a direction normal to the geometric plane generally defined by the surface. The calculating of each distance includes trigonometrically relating an oblique angle and a separation. According to frequent inventive practice, the trigonometrically relating includes equating the tangent of the oblique angle to the quotient represented by the division of the separation by the distance.

According to some inventive embodiments, the method comprises performing sequentially, at least twice, the combination of steps including the generating, the measuring and the calculating; for instance, if the surface is the surface of a fluid wave, the method further comprises causing the fluid wave to be in motion, and the sequential performance yields at least two different values of the distance. The present invention may be particularly beneficial in its capability of performing the combination of steps concurrently for each of plural light beams corresponding to plural locations on the surface; such inventive embodiments can be informative as to the shape of a surface or a portion thereof.

Typical inventive apparatus is for evaluating the configuration of a surface. The inventive apparatus comprises: (a) a pair of laser devices for projecting two laser beams crossing each other; (b) a camera for photographing the scattering of said two laser beams by said surface; and, (c) computer means for determining the slope of said surface at a slope location. Each laser device projects a laser beam upon the surface, which generally describes a geometric plane. The camera creates an image including two separate image spots that respectively manifest two separate scatter locations. Each scatter location is a location on the surface at which a laser beam is scattered by the surface. The slope location is a location on the surface that is between the two scatter locations. The determination of the slope includes consideration of: (a) the respective orientations of said two laser beams relative to the geometric plane generally described by the surface; and, (b) the separation distance of each image spot in the image with respect to a corresponding photographic reference location.

The inventive GLRP typically projects at least one laser beam upon a target surface at an acute (usually, small) angle with respect to the geometric normal to the geometric plane generally described by the target surface configuration. A portion of the beam hits and is scattered from a "scatter point" of the target surface so as to result in a photographic image upon the image sensing component of a camera, which is situated so that the image sensing component defines a geometric plane which is parallel to the geometric plane generally described by the target surface configuration. A photographic image (typically in the form of a rather nebulous spot) is created in or on the image sensing component of the camera, the photographic image lying in a geometric line that passes through the scatter point and is normal to the geometric plane generally described by the target surface configuration. The originally transmitted beam is disposed at a selected angle with respect to the scatter beam creating the photographic image.

A computer is typically employed to determine the relative displacement of the photographic image, such displacement being commensurate with the distance traveled by the projected laser beam; that is, longer beam paths are associated with longer image displacements (and, conversely, shorter beam paths are associated with shorter image displacements). Application of geometric principles to known and measured values (vis., the original beam's angle from normal, and the photographic image's distance from reference point) yields a value indicative of the elevation of a point on the target surface. According to inventive "single-beam" embodiments, a computer is used to calculate the distance of the photographic image from a reference point (e.g., a marker or projected image). The computer determines the elevation at the scatter point of the target surface as part of a single geometric triangle.

According to inventive "double-beam" embodiments, two beams are concurrently generated at equal and opposite angles with respect to the normal so as to criss-cross (intersect) each other, thereby forming two corresponding geometric triangles. Each beam is scattered so as to leave a photographic image, the two resultant photographic images being separated from each other. A computer is used to calculate the distance between the two photographic images. The elevation at a measurement point (located between the respective scatter points) on the target surface is determined using the computer, based on the supposition that the two geometric triangles together form a single isosceles triangle. Furthermore, according to many inventive embodiments, the slope at a measurement point (located between the respective scatter points) on the target surface is determined using the computer, based on the geometric properties of the two adjacent geometric triangles each corresponding to a scatter point.

The inventive GLRP is comparable to conventional laser rangefinding insofar as availing of sound geometric principles; however, the inventive GLRP achieves effective results using different apparatus and different geometric principles. According to typical inventive practice a basic abstract trigonometric concept is availed of, namely that in a right triangle the tangent of an interior angle equals the ratio of the opposite (non-hypotenuse) side over the adjacent (non-hypotenuse) side. Advantageously, because of the unique features of the present invention, the inventive GLRP methodology is capable of performing cost-effective measurements at many locations on a surface simultaneously, thereby evaluating the "topography" of the surface. This simultaneous multi-measurement capability is especially propitious when the surface is dynamic (rather than static), such as a surface of a wave or other moving fluid. In such applications, at a certain point in time the present invention can render a photographic "snapshot" encompassing multiple locations of a fluid surface that is constantly changing. The snapshots can be inventively rendered on plural occasions to demonstrate how the surface configuration is changing. In accordance with many embodiments of the present invention, plural (e.g., multiple) laser beams are utilized for tagging plural (e.g., a large number) of spots, an area-scan camera is utilized as a detector, and the distance from the beam origin to the target surface at an array of locations is measured. For inventive embodiments that use plural (e.g., two or three) laser beams for each measurement spot, the surface slope in plural directions can be obtained as well.

Existing techniques and methodologies such as those implementing sonic probes and finger probes are capable of profiling a liquid/air interface or a solid/air interface at, at most, only a few discrete locations. The present invention's GLRP is a field measurement technique capable of performing instantaneous measurements at a large array of points, covering a large physical area. The inventive field measurement technique meets requirements for a wide range of applications, such as involving direct input to a ship motion calculation or involving CFD validation of a computed wave field.

Other objects, advantages and features of the present invention will become apparent from the following detailed description of the invention when considered in conjunction with the accompanying drawings.

BRIEF DESCRIPTION OF THE DRAWINGS

In order that the present invention may be clearly understood, it will now be described, by way of example, with reference to the accompanying drawings, wherein like numbers indicate the same or similar components, and wherein:

As shown in FIG. 5, the wave is traveling from right to left.

DETAILED DESCRIPTION OF THE INVENTION

Figure 1:
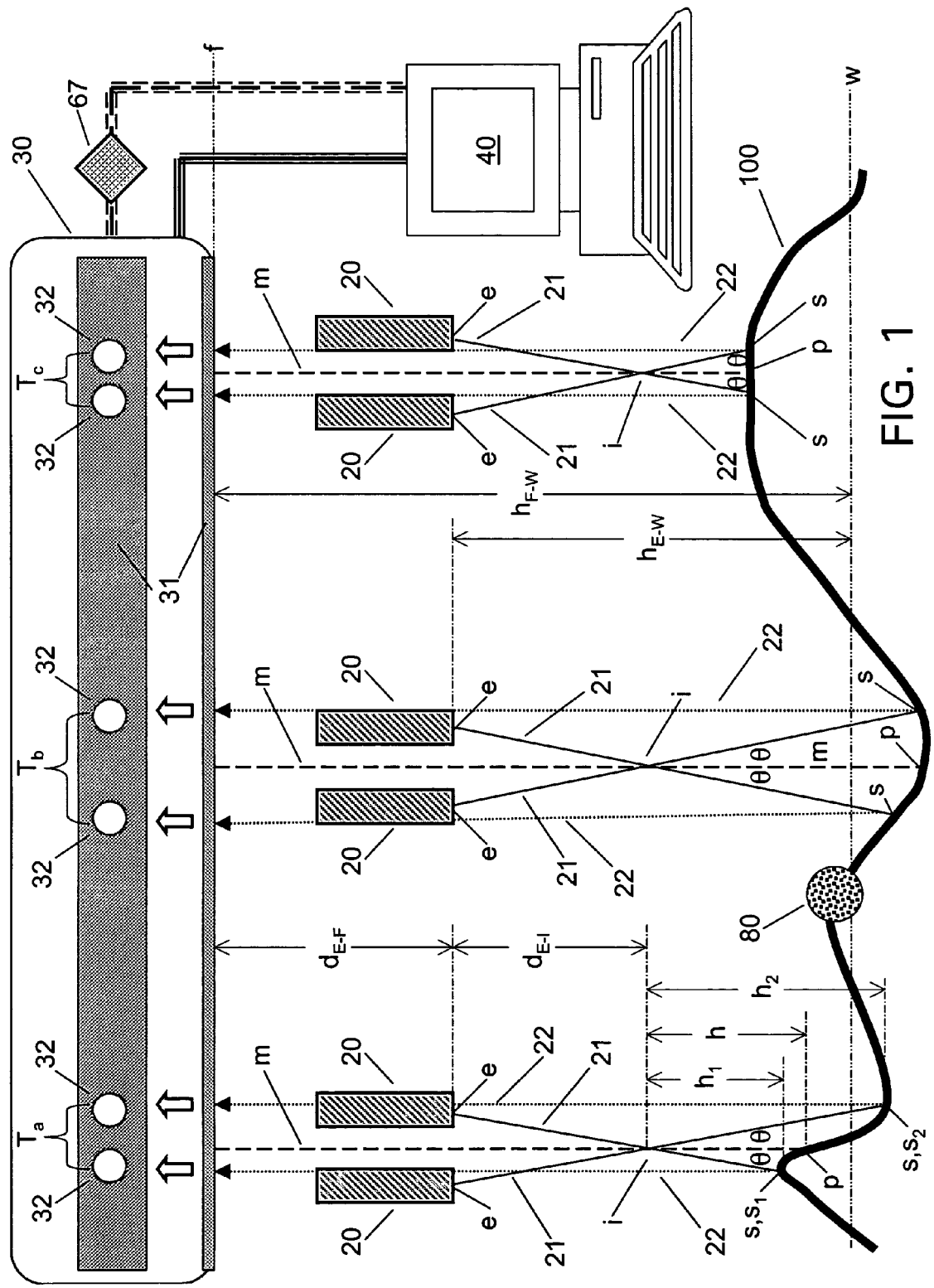
FIG. 1 is a schematic representation of an embodiment of a multi-laser, two-beam GLRP system in accordance with the present invention. The digital camera includes an image sensor that is diagrammatically shown both in edge view and plan view, the former view illustrating the reception by the camera's image sensor of light scattered by the surface being measured, the latter view illustrating the resultant rendering of raw imagery upon the camera's image sensor.

Referring now to FIG. 1, inventive GLRP system 200 comprises three pairs of double-beam laser devices 20, an area-scan camera 30, and a computer system 40. Each laser device 20 emits a laser beam 21. Each beam 21, in turn, strikes and is scattered by surface 100 in a scatter path 22 that reaches digital camera 30 so as to form an image spot 32 on the image sensor 31 of digital camera 30. The raw image spots 32 are processed by computer 40. Not shown but appreciable as present are electrical power means and structural support means for the inventive apparatus including lasers 20, camera 30 and computer 40.

Laser 20 can be either a diode laser (also known as a laser diode or injection laser) or a conventional laser (such as helium-neon, ruby, and gas types). A laser diode is a semiconductor device that, when current passes therethrough, produces coherent radiation (wherein the waves propagate at the same frequency and phase) in the visible or infrared spectrum. As compared with conventional lasers, laser diodes usually are smaller and lighter, have lower power requirements, and are lower in intensity.

According to typical inventive practice, GLRP simultaneously effectuates measurements at numerous locations on a surface such as water wave surface 100. For illustrative purposes, only three pairs of lasers 20 are shown in FIG. 1. A total of six laser beams 21 is transmitted, each by its respective laser 20. The six laser beams 21 indicate ("tag") three measurement points (locations) p that are situated on surface 100. Each surface point p has associated therewith two roughly rounded image spots 32, slightly separated from each other, that are generated via scattering paths 22 onto camera film 31 by the corresponding pair of lasers 20. The ordinarily skilled artisan who reads this disclosure will appreciate that the present invention can be practiced using practically any plural number of lasers 20, and that use of numerous lasers 20 may be propitious for many applications.

Figure 2:
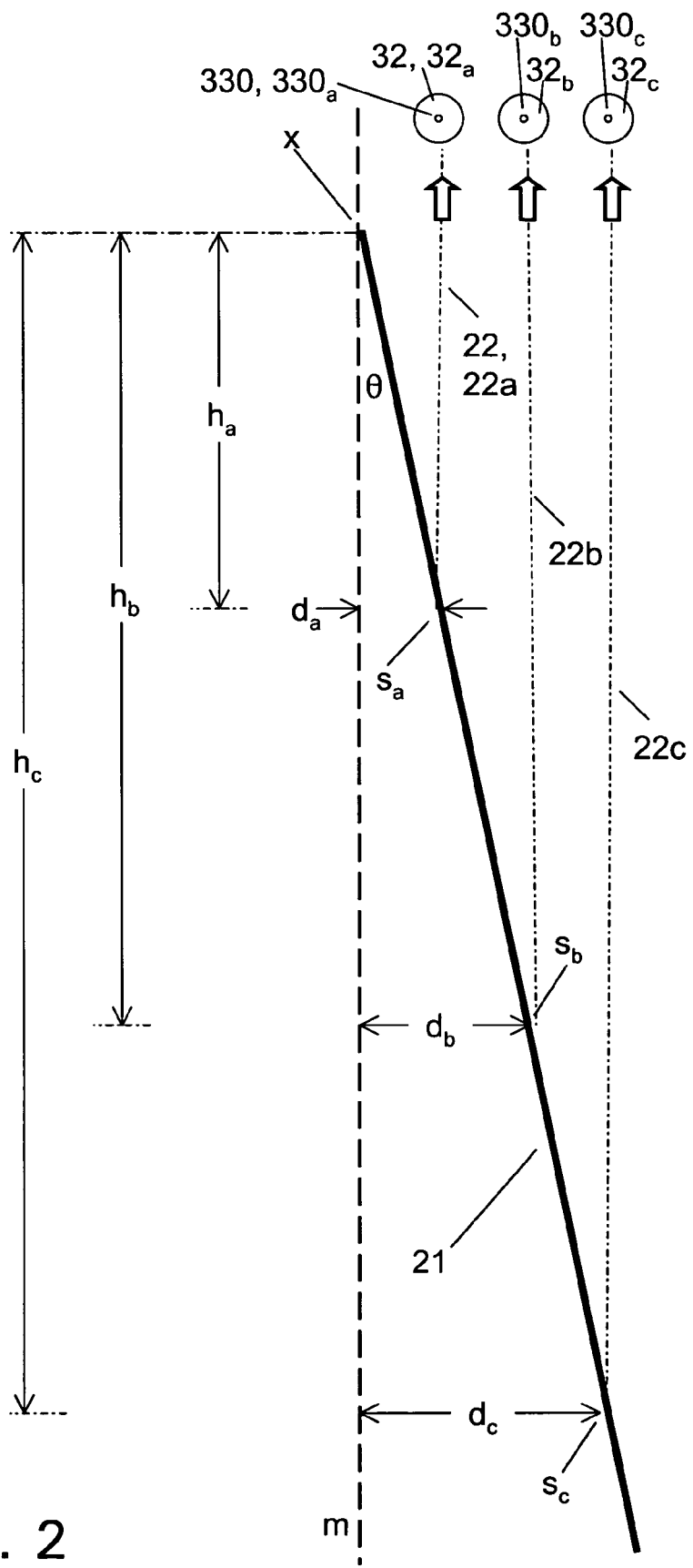
FIG. 2 is a diagram illustrating typical inventive practice in terms of important geometric relations associated with transmission, surface scattering and camera imaging of a laser beam. In particular, FIG. 2 reveals how the distance corresponding to a camera image (e.g., relative to another location on the imaging plane) is commensurate with the distance corresponding to the laser beam
Figure 4:
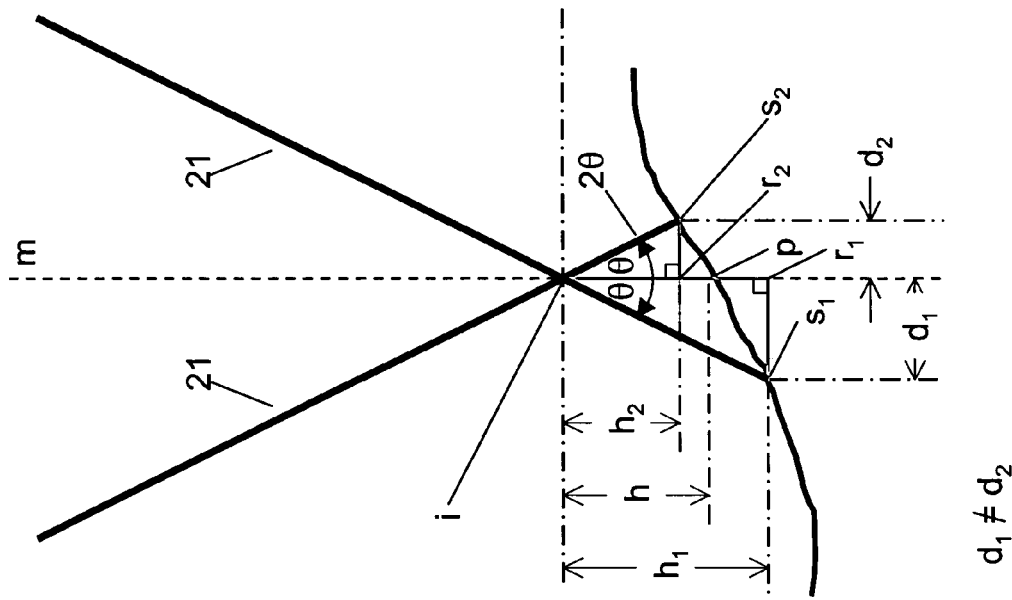
FIG. 4 is a diagram illustrating the present invention's two-beam GLRP concept, as typically embodied, for measurement of surface slope at a single point on a water wave surface.
Figure 3:
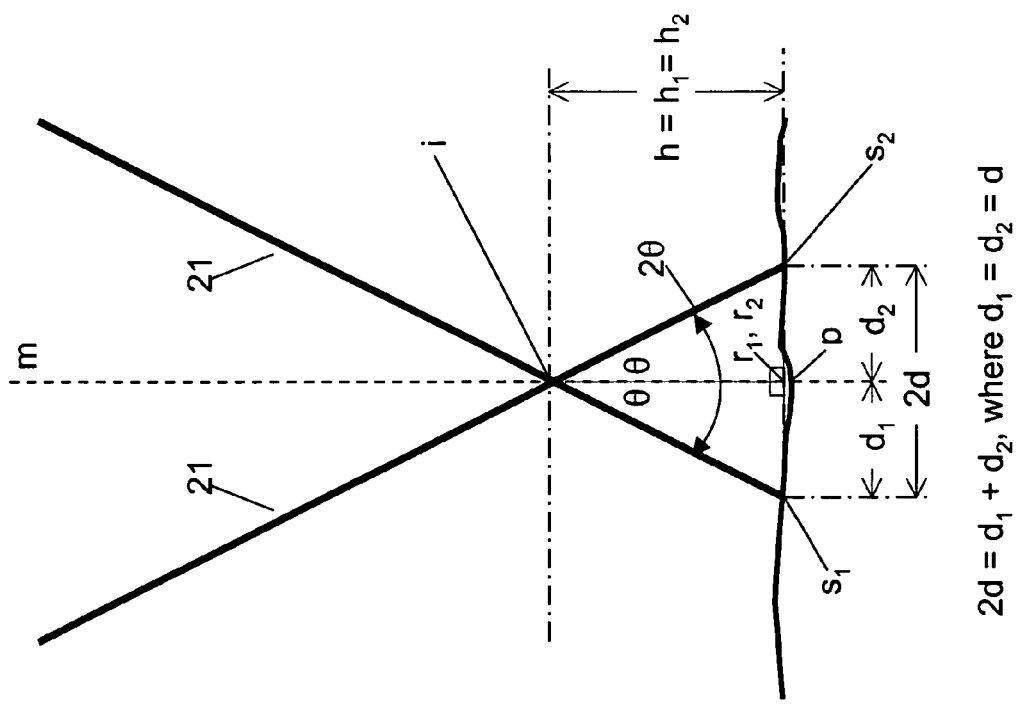
FIG. 3 is a diagram illustrating the present invention's two-beam GLRP concept, as typically embodied, for measurement of surface elevation at a single point on a water wave surface.

Still with reference to FIG. 1 and also with reference to FIG. 2 through FIG. 4, each surface point p has associated therewith a pair of lasers 20, a pair of laser beams 21, a pair of scatter paths 22, a pair of scatter points s, a geometric medial line (median) m, a pair of equal and adjacent geometric angles θ, and a pair of image spots 32. FIG. 1, FIG. 3 and FIG. 4 each depict how the respective laser beams 21 of two paired lasers 20 correspond to a surface point p. Each median m is situated equidistantly intermediate two corresponding laser beams 22, and is situated either equidistantly or non-equidistantly intermediate two corresponding scatter paths 22. Each median m is perpendicular to the geometric plane s that is generally defined by surface 100, and is coplanar with its corresponding two beams 21 and two scatter paths 22. Median m intersects the corresponding surface point p and bisects the angle defined by the corresponding pair of beams 21. Two equal, adjacent angles e are formed wherein each angle θ is formed by median m and a beam 21. FIG. 1 shows a preferred inventive approach wherein each intersecting pair of beams 21 is associated with the same oblique angle, viz., angle θ; nevertheless, inventive practice permits variation in the value of this oblique angle between two or more different pairs of beams 21.

Every laser 20 in inventive GLRP system 200 is situated at the same height with respect to surface plane w; hence, every laser emission point e (e.g., the tip of the laser 20) is situated at the same height $h_{E\text{-}W}$ with respect to surface plane w, which is the geometric plane generally defined by surface 100. Further, every laser emission point e is situated at the same distance $d_{E\text{-}F}$ with respect to image sensor plane f (the geometric plane defined by image sensor 31) and at the same distance $d_{E\text{-}I}$ with respect to the corresponding beam crisscross intersection point i. Area-scan camera 30 (more specifically, image sensor 31) is situated at a constant camera height $h_{F\text{-}W}$ with respect to surface plane w. The laser emission points e of all beams 21 are collinear and/or coplanar, are parallel to surface plane w, and are parallel to the geometric plane f defined by image sensor 31 of area-scan camera 30. Each pair of laser beams 21 is propagated so as to cross at the same angle θ with respect to median m, which is perpendicular to surface plane w. Each beam 21 is scattered by surface 100 at a scatter point s. Each measurement point p is generally interposed between the corresponding pair of scatter points s, e.g., $s_1$ and $s_2$.

The laser emission points e are at a constant same height $h_{E-W}$, and each pair of laser beams is characterized by the same beam-crossing configuration describing the same pair of angles θ. An array of image spots 32 is formed on camera image sensor 31 so as to be coherently indicative of both the elevation (height) and the slope of surface 100 at any given point p. Area-scan camera 30 represents a kind of detector that is capable of taking a "snapshot" photograph, in two dimensions, of the scattered laser beams. It is noted that inventive practice does not require constancy or uniformity of angles θ or laser heights or laser emission point heights $h_{E-W}$ (such heights being measured relative to the surface plane w), such as illustrated in FIG. 1; some inventive embodiments provide for variation in angles θ and/or laser heights and/or laser emission point heights $h_{E-W}$.

Accordingly, the actual distance from a beam origin e to the corresponding point p on the target surface 100 equals $h+d_{E-I}$, where h is the distance from intersection point i to the target surface point p, and $d_{E-I}$ is the distance from intersection point i to beam origin e. Similarly, the actual distance from image sensor plane f to a point p on the target surface 100 equals $h+d_{E-I}+d_{E-F}$, where $d_{E-F}$ is the distance from beam origin e to image sensor plane f. These laser-to-surface (or camera-to-surface) distances can be computed at each of an array of locations, such as through the use of a computer 40 having a computer program product that is capable of performing data processing of measurement data. As elaborated upon hereinbelow with reference to FIG. 4, many inventive embodiments use plural beams for each measurement spot, thereby obtaining one or more surface slopes in addition to or instead of the surface elevation.

Typical inventive embodiments implement a digital camera 30 (having image sensor 31), the photographic information of which is directly input to a computer 40 for processing. Nevertheless, the present invention can be practiced implementing an "old-fashioned" film camera (having film 31), whereby the photographic information is digitized (as by a digitizer such as analog-to-digital converter 67) and is then input to a computer 40 for processing.

As shown in FIG. 1, FIG. 3 and FIG. 4, two laser beams 21 are respectively emitted from a pair of commercial, off-the-shelf laser diodes 20, and are projected onto the water surface 100 at an incident angle of nearly (but appreciably less than) ninety degrees (90°). Beams 21 each form the same positive or negative angle θ with respect to median m, which are parallel to each other. Each beam 21 is strongly scattered by "floaters" 80 (e.g., micron-sized buoyant hollow glass spheres or dye mixed into the surface 100 layer) on the water surface 100; floaters 80 are shown in a magnified view in FIG. 1. The image of the scattered beam 22 is recorded via an area-scan camera 30.

FIG. 2 illustrates the variation of horizontal distance d in accordance with vertical distance h. Image spot $32_a$ is formed by vertical scatter path $22_a$; image spot $32_b$ is formed by vertical scatter path $22_b$; image spot $32_c$ is formed by scatter path $22_c$. The distance d is actually taken with respect to centroid 330 of image spot 32, centroid 330 having been determined using computer 40. Distance d is the distance between an image spot 32 and median m, which equals the distance between the corresponding scattering point s and median m. Distance $d_c$ is greater than distance $d_b$, which is greater than distance $d_a$; height-wise distance $h_c$ is greater than height-wise distance $h_b$, which is greater than height-wise distance $h_a$. It is seen that horizontal distance d increases with increasing vertical distance h.

Because each projected beam 21 makes a slight angle θ to the surface normal (such as indicated by median m), the illuminated spots are horizontally displaced from a neutral position (such as median m) as the water-surface 100 elevation changes. By judiciously choosing the beam 21 angle θ for an expected peak-to-peak wave height, each beam 21 can be contained within a certain distance d (e.g., less than half grid spacing) from its neutral position, viz., medial line m. In this way, an array of surface elevation measurements and/or surface slope measurements can be made without confusing the neighboring beams 21.

The height value h is understood to be a value relative to a reference height (e.g., $h+d_{E-I}$, or $h+d_{E-I}+d_{E-F}$), and is thus indicative of the height of the surface 100 of the wave. Computer 40 processes the separation information regarding image spot 32, received from camera 30, computer 40 thereby finding a value for d, the horizontal distance between median m and a scattering point s. Computer 40 also contains in its database the value of tan θ, since a value of θ is pre-selected for the inventive apparatus configuration. Computer 40 uses the following trigonometric relationship to determine height h:

$$h = d/\tan θ$$

where θ is the angle formed by laser beam 21 relative to median m, and d is the horizontal distance between an image spot 32 and median m (or, equally, the horizontal distance between the corresponding scattering point s and median m).

As shown in FIG. 3, 2θ is the crossing angle of the paired beams 21. The triangle formed by vertices i, $s_1$ and $s_2$ is isosceles, or approximately so; that is, the distance between point i and point $s_1$ equals the distance between point i and point $s_2$, median m bisects this isosceles triangle, and points $s_1$ and $s_2$ are horizontally even with each other. For some inventive embodiments (or for some inventive measurements), an assumption is thus made that horizontal distance $d_1$ equals horizontal distance $d_2$; therefore, the horizontal distance T between image spots 32 (or, equally, between scatter points s) equals the sum $d_1+d_2$, which equals 2d, which equals T. In other words, since angle θ is small (as is frequent in inventive practice), it is assumed that vertical distances h, $h_1$ and $h_2$ are equal to each other, and that 2d is the horizontal distance between the points $s_1$ and $s_2$ on water surface 100. It is noted generally that, according to inventive principles, angle θ can be any value greater than zero degrees and less than ninety degrees.

Angle 2θ also represents the crossing angle of the paired beams 21 shown in FIG. 4. However, as distinguished from FIG. 3, a significant slope exists in surface 100 at surface point p in FIG. 4. That is, the horizontal distance T between image spots 32 (or, equally, between scatter points s) still equals the sum $d_1+d_2$, but $d_1$ does not equal $d_2$, and hence T does not equal 2d. As shown in FIG. 4, two right triangles are formed that are adjacent to each other, viz.: (i) the triangle having vertices i, r, and $s_1$; and, (ii) the triangle having vertices i, $r_2$ and $s_2$. In the first triangle, tan θ=$d_1/h_1$. In the second triangle, tan θ=$d_2/h_2$. Hence, in accordance with an inventive two-beam GLRP system such as depicted in FIG. 4, the slope of the water surface 100 in one direction is trigonometrically determined as follows:

$$h_1 = d_1/\tan\theta$$

$$h_2 = d_2/\tan\theta$$

$$\text{slope} = \frac{\Delta h}{d_1 + d_2} = \frac{d_2 - d_1}{d_2 + d_1}\frac{1}{\tan\theta}$$

where $d_1$ and $d_2$ are the respective horizontal displacements of the paired image spots 32 (or, equally, of the paired scatter points s) from medial line m. Medial line m is the reference location for image spots 32 (or, equally, for the paired scatter points s) in such calculations.

Figure 5:
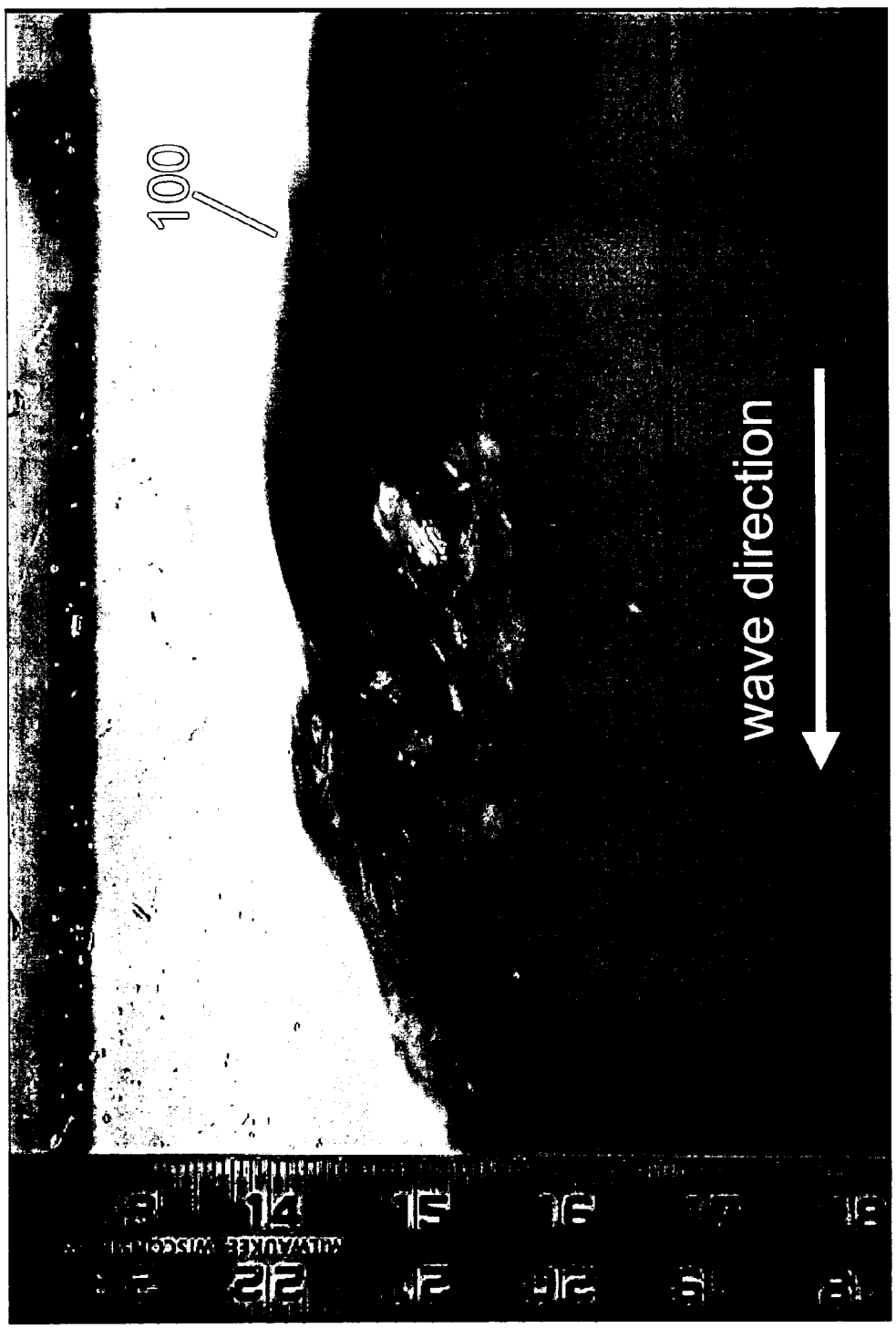
FIG. 5 is a side pictorial view of a wave that was measured through experimental practice of a two-beam GLRP system in accordance with the present invention, similar to that depicted in FIG. 3 and FIG. 4.

A single-measurement point, two-beam inventive GLRP prototype, similar to the inventive GLRP systems illustrated in FIG. 1, FIG. 2 and FIG. 4, was built and tested in the Miniature Water Basin at the Naval Surface Warfare Center, Carderock Division (NSWCCD), located in West Bethesda, Md. The inventive prototypical apparatus included two laser diode modules 20 (Radio Shack) and a Roper Scientific ES4.0 digital camera 30 (2k×2k pixel resolution). It is pointed out that these commercial off-the-shelf laser diodes 20 were purchased from Radio Shack at retail for $10 per unit; the inexpensiveness in this regard suggests the economic feasibility of rendering measurements at a large number of surface points p. A wave train was generated at the far end of the basin, and measurement was taken roughly in the middle of the basin. The wave train traveled from right to left, as shown in the snapshot of FIG. 5. A large contact angle $\theta$ was chosen, primarily for visual impact.

Figure 6:
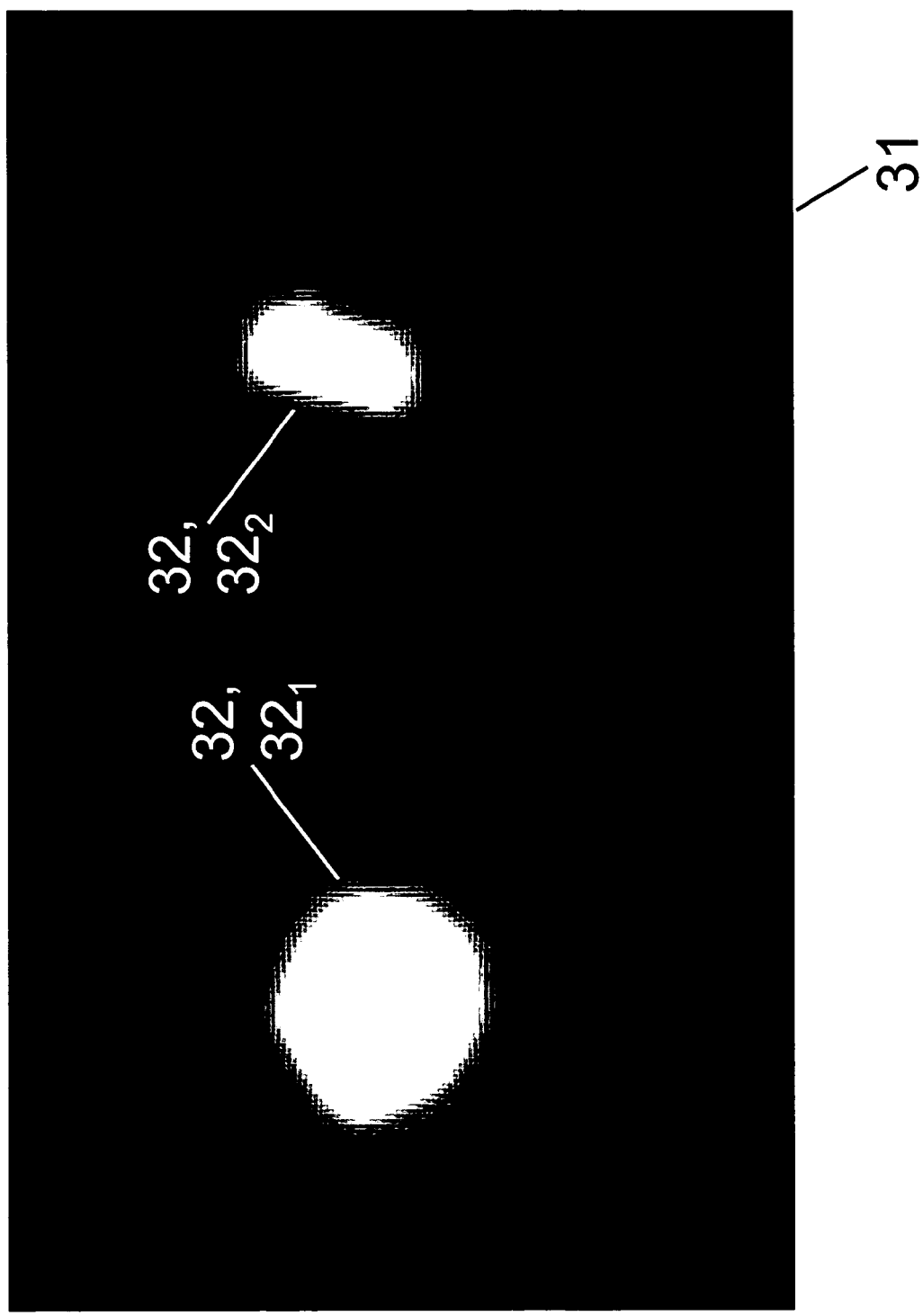
FIG. 6 is a magnified view of a raw photographic image taken of two laser spots in inventive experimentation associated with the wave shown in FIG. 5.
Figure 7:
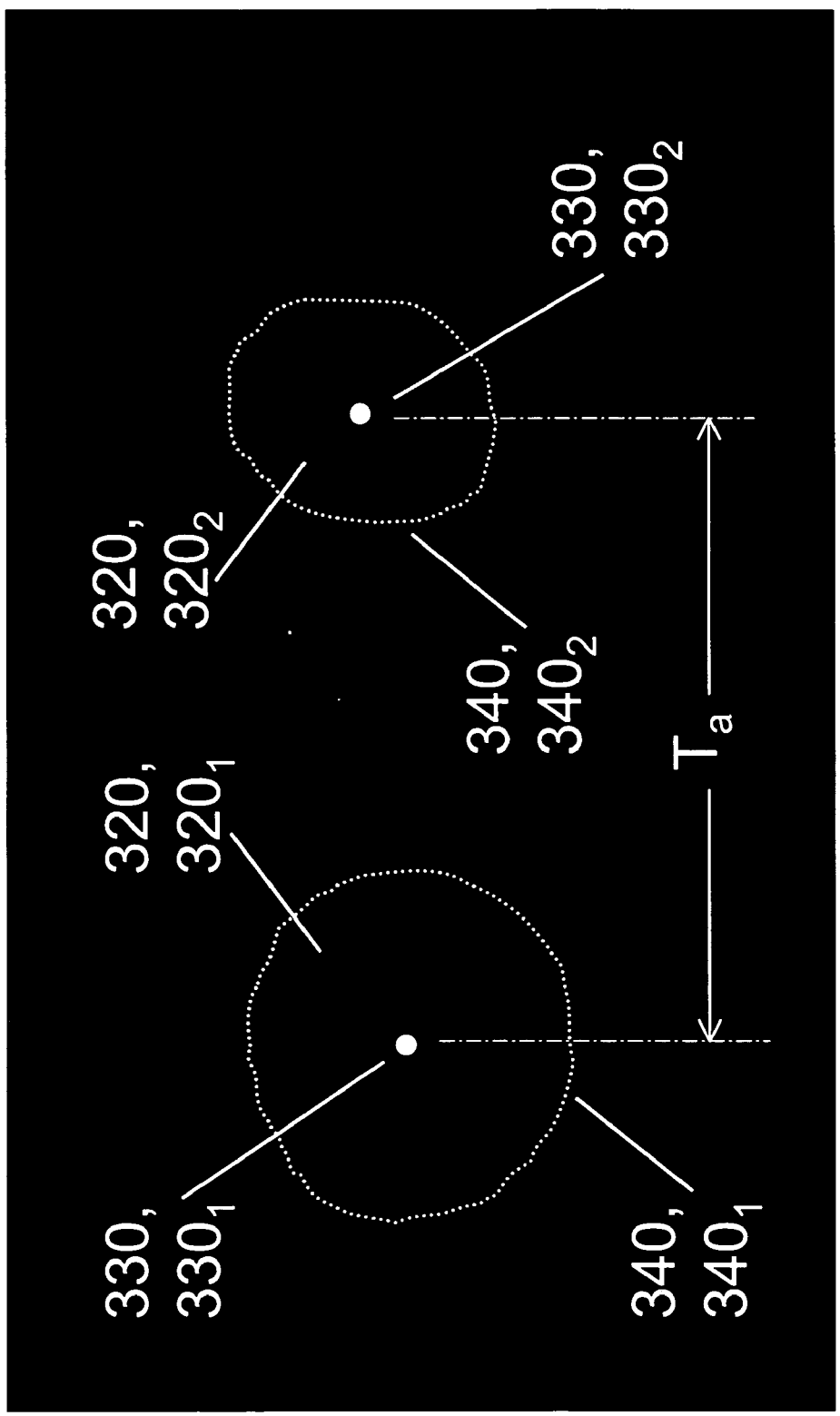
FIG. 7 is a magnified view of a processed image of the two laser spots shown in FIG. 6, wherein the two laser spots are at the peak of the wave shown in FIG. 5. The two closed peripheral delineations indicate the two areas where the present invention's software has identified (e.g., via light borderline) two distinct "blobs" corresponding to the two laser spots shown in FIG. 6.
Figure 8:
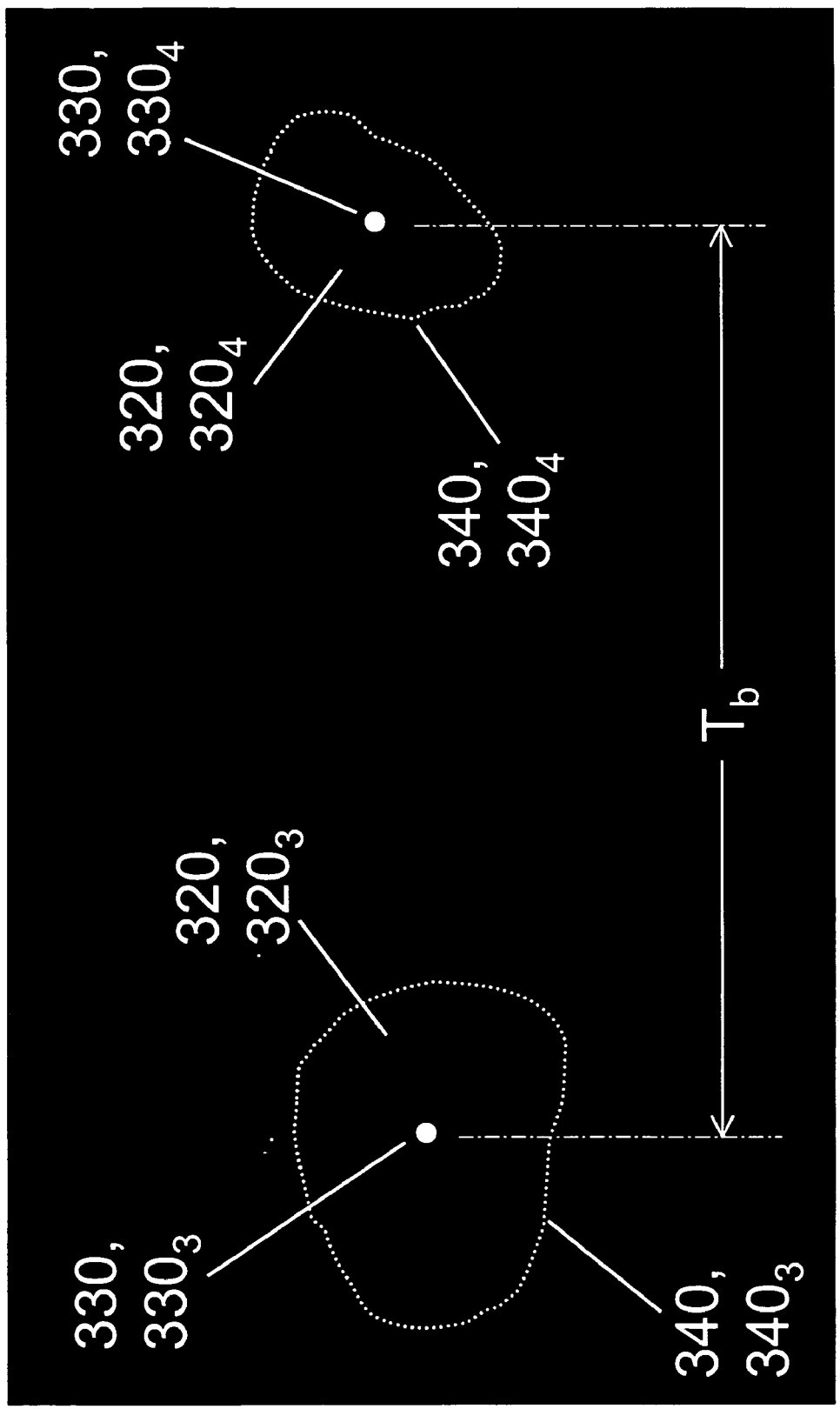
FIG. 8 is a magnified view of a processed image of the two laser spots that are at the trough of the wave shown in FIG. 5. Again, the two closed peripheral delineations indicate the two areas where the present invention's software has identified (e.g., via light borderline) two distinct blobs corresponding to the two laser spots shown in FIG. 6. Note that the distance between the two blobs in FIG. 8 is larger than that in FIG. 7.

FIG. 6 through FIG. 8 portray examples of raw image spots 32 (FIG. 6) and processed image spots 320 (FIG. 7 and FIG. 8), FIG. 7 representing the processed version of FIG. 6. FIG. 6 and FIG. 7 show corresponding pictures of the scattered beams (raw and processed, respectively) at the peak of the wave. To process the camera 30 raw photographic image shown in FIG. 6, a blob analysis routine was used that was resident in the memory of computer 40. Blobs $32_1$ and $32_2$ (shown in FIG. 6) were processed into spots $320_1$ and $320_2$ (shown in FIG. 7), respectively. The two distinct "blobs" $32_1$ and $32_2$ shown in FIG. 6 were first identified by the blob analysis program, as delineated by peripheries $340_1$ and $340_2$ of the processed image spots $320_1$ and $320_2$ shown in FIG. 7. As also illustrated in FIG. 7, the centroid c for each blob 32 was then determined, wherein processed spot $320_1$ was characterized by centroid $330_1$, and processed spot $320_2$ was characterized by centroid $330_2$. In accordance with inventive principles described hereinabove with reference to FIG. 3, the horizontal distance between the centroids $330_1$ and $330_2$ was T=2d, and this horizontal distance was used to calculate wave height h. FIG. 8 shows the processed image at the trough of the wave. As demonstrated by FIG. 7 versus FIG. 8, the two spots are farther apart at the trough of the wave than at the peak of the wave.

As demonstrated by the comparative resolutions of the processed image spots 320 shown in FIG. 7 and FIG. 8, the lefthand laser beam 21 (resulting in processed image spot $320_1$ in FIG. 7, and in processed image spot $320_3$ in FIG. 8), is of a higher quality than is the righthand laser beam 21 (resulting in processed image spot $320_2$ in FIG. 7, and in processed image spot $320_4$ in FIG. 8). It is evident in FIG. 7 and FIG. 8 that using beams of lower quality (e.g., the righthand beams shown in FIG. 7 and FIG. 8) will not adversely affect the measurements, as for most inventive applications the centroids 330 will remain sufficiently coincident regardless of beam quality. This suggests robustness of the present invention's methodology in that the inventive practitioner who integrates the inventive system is not required to cull for "perfect" laser diodes 20.

Figure 9:
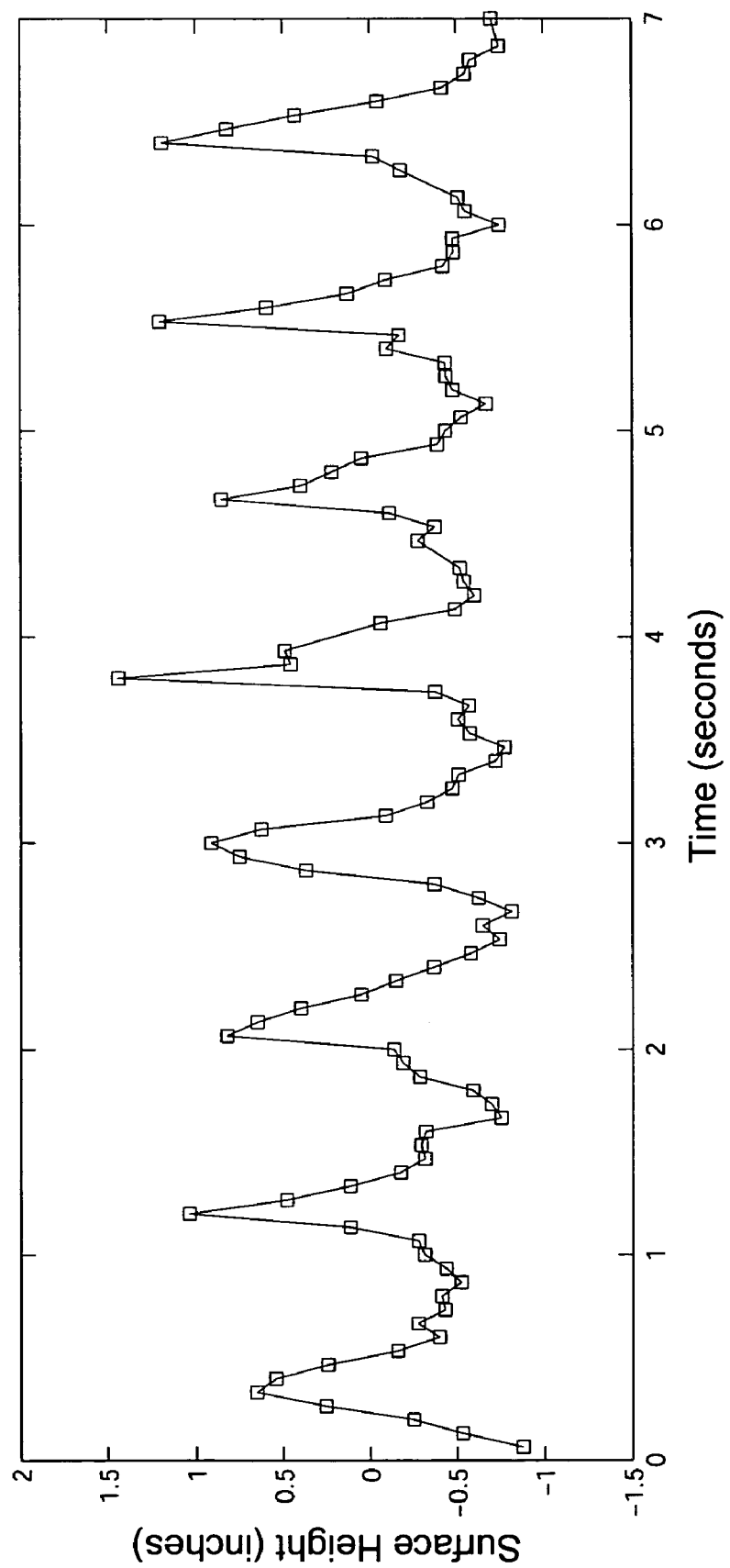
FIG. 9 is a graph showing measured wave height versus time spots in inventive experimentation associated with the wave shown in FIG. 5.

FIG. 9 shows the measured surface 100 wave heights, as a function of time. The measurements are taken at a single measurement point p of wave surface 100, wherein measurement point p was associated with the same pair of intersecting beams 21. On a generally continual basis, the location of measurement point p changed in accordance with the changing configuration of wave surface 100. As shown in FIG. 9 about a hundred measurements are taken sequentially in a time span of about seven seconds. The water wave is moving from right to left as portrayed in the snapshot of FIG. 5. Note that FIG. 5 shows the typical profile of a wave on the verge of breaking, with a higher slope in the front of the wave. The measurements shown in FIG. 9 correspondingly demonstrate a higher slope in the front of the waves than in the back of the waves.

Figure 10:
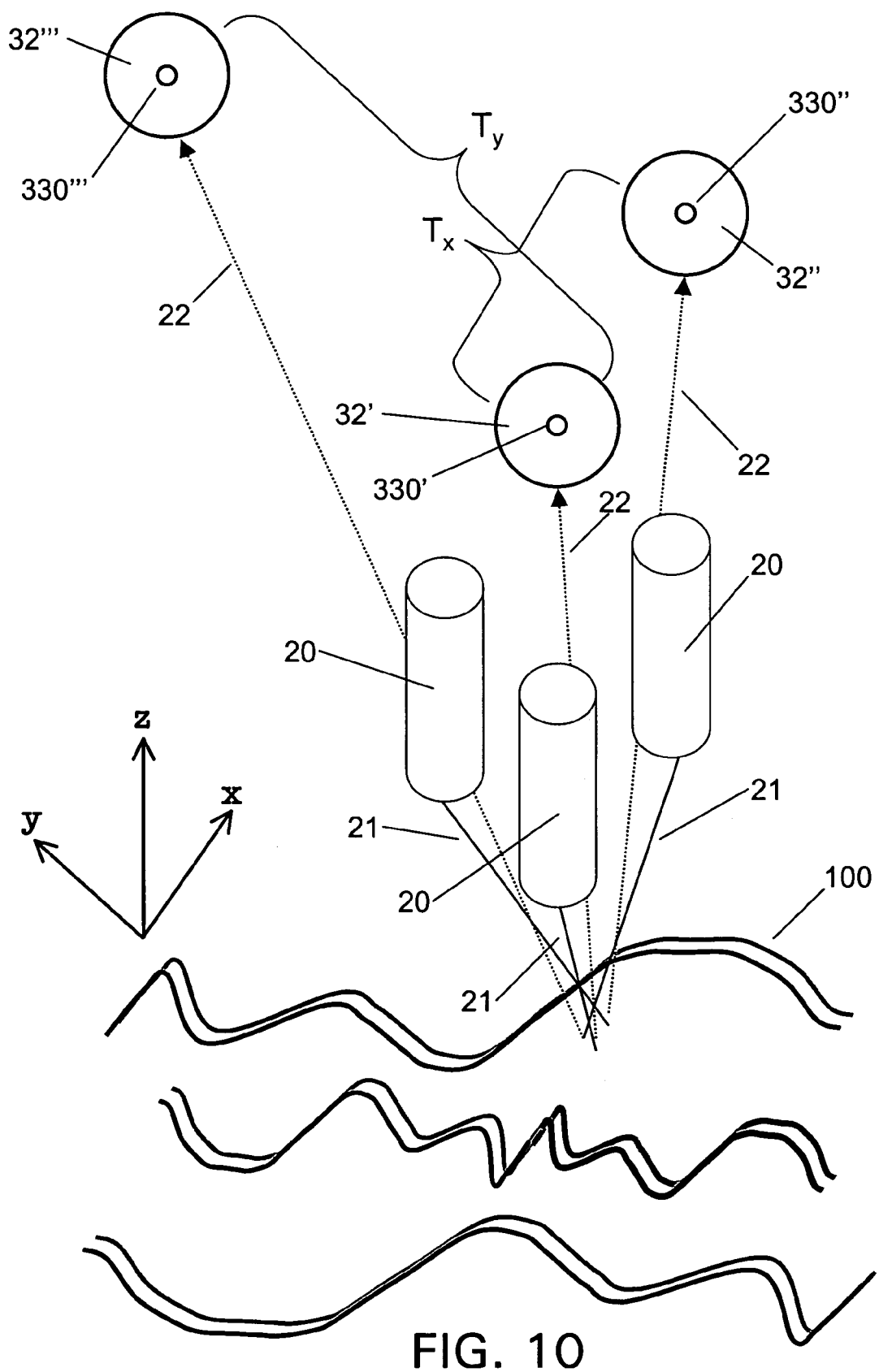
FIG. 10 is a schematic representation, largely in perspective, of inventive laser apparatus effecting three-beam GLRP, which is suitable for measuring the surface slope of the wave in each of two different directions.

FIG. 1, FIG. 3 and FIG. 4 illustrate inventive practice involving two beams per surface measurement point p. FIG. 3 is illustrative of inventive determination of surface elevation. FIG. 4 is illustrative of inventive determination of surface slope, but in only one direction (which can be obtained instead of or in addition to the surface elevation). With reference to FIG. 10, if surface slopes in two directions are required, a three-beam inventive GLRP system may conceptually utilize up to three laser beams that form a diverging triangular pattern. As shown in FIG. 10, a first horizontal distance, $T_x$, is the distance between the computer-processed centroid 330' (of blob 32') and the computer-processed centroild 330" (of blob 32"). A second horizontal distance, $T_y$, is the distance between the computer-processed centroid 330' (of blob 32') and the computer-processed centroild 330''' (of blob 32'''). Distance $T_x$ and distance, $T_y$, define directions that are perpendicular to each other.

Figure 11:
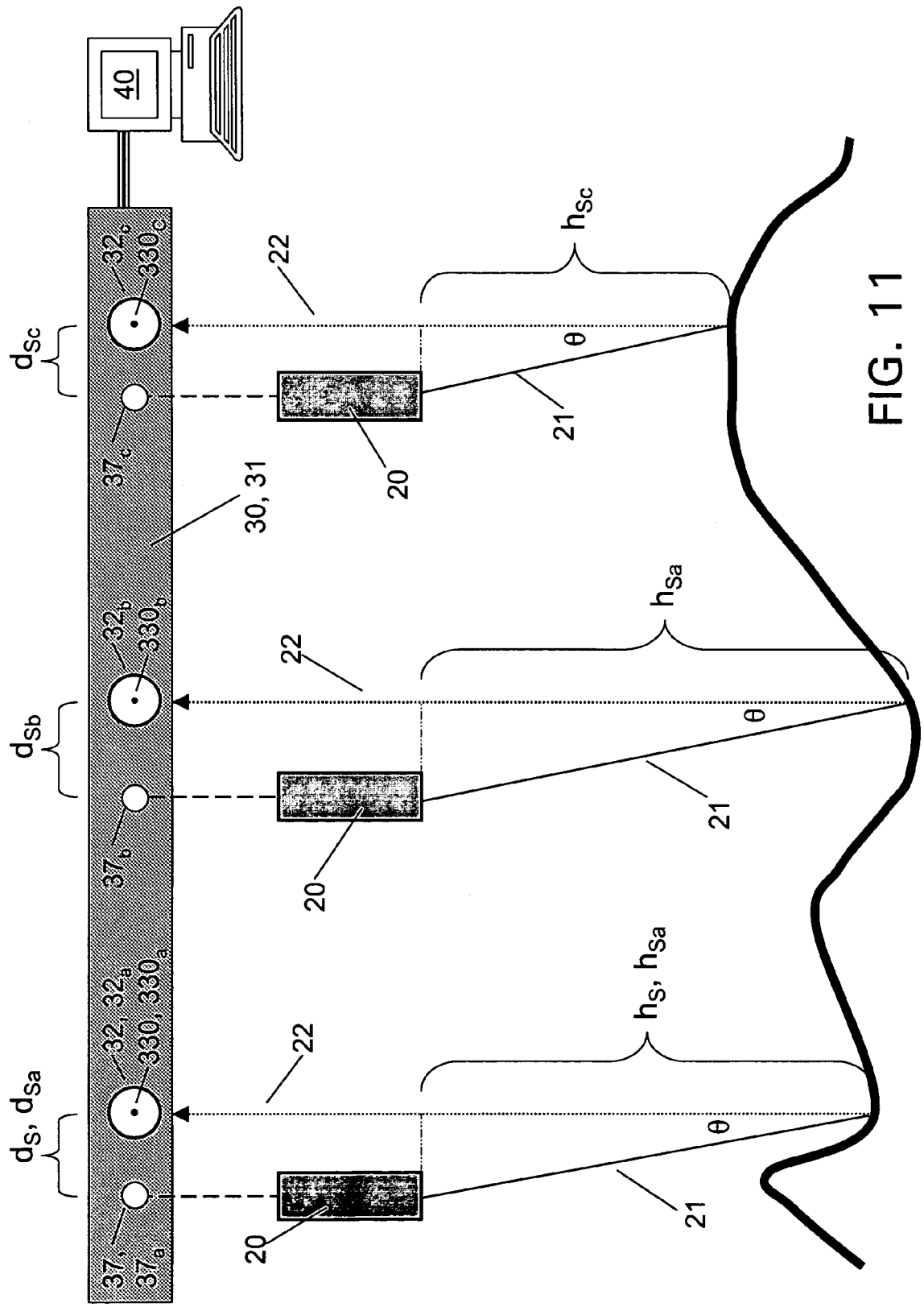
FIG. 11 is a schematic representation of an embodiment of a multi-laser, one-beam GLRP system in accordance with the present invention.

Now referring to FIG. 11, some inventive embodiments describe a single-beam mode rather than a plural-beam mode. If only surface elevations are desired, the inventive measurement can be made using only one beam. This simplifies the inventive GLRP concept when surface slopes are not required. For trigonometric purposes in inventive single-beam embodiments, a distance $d_s$ is measured between a single blob 32 and a reference location such as reference point 37, both blob 32 and point 37 existing in or on image sensor 31. The reference point 37 can be demarcated in any of various ways, such as by a digital marker or by a digital image projected by a laser beam emitted (e.g., by another laser device) in an upward vertical direction from a location atop laser device 20. The height $h_s$ is determined, based on distance $d_s$ and angle $\theta$, according to the trigonometric equation $h_s = d_s/\tan\theta$.

An inventive one-hundred-point, single-beam GLRP prototype was built and tested in the Miniature Water Basin at the Naval Surface Warfare Center, Carderock Division (NSWCCD), located in West Bethesda, Md., using commercial off-the-shelf laser-diode modules 20 and a high-resolution area-scan camera 30. The single-beam prototypical setup was similar to that shown in FIG. 11. Wave trains of various heights and propagation speeds were generated using a wave maker. Measurements of the wave heights along a line near the side wall of the basin were taken via the inventive GLRP system and were found to favorably compare with flow visualization.

The present invention is not to be limited by the embodiments described or illustrated herein, which are given by way of example and not of limitation. Other embodiments of the present invention will be apparent to those skilled in the art from a consideration of this disclosure or from practice of the present invention disclosed herein. Various omissions, modifications and changes to the principles disclosed herein may be made by one skilled in the art without departing from the true scope and spirit of the present invention, which is indicated by the following claims.

What is claimed is:

1. A method for determining at least one configurative characteristic of a surface, said method comprising:

emitting at least one pair of intersecting light beams, each said light beam being disposed at an oblique angle with respect to a geometric normal to the geometric plane generally defined by said surface, each said light beam being scattered by said surface at a corresponding surface location, each said pair of intersecting said light beams striking said surface so that the corresponding said oblique angles are equal and oppositely disposed;

generating a photographic image, said photographic image containing at least two photographic forms, each said photographic form being associated with the scattering of a corresponding said light beam by said surface;

measuring at least one pair of separations, each said separation being between a photographic form and a corresponding photographic reference location in said photographic image, each said separation of said pair of separations being between a said photographic form and the same said reference location, each said photographic form being associated with the scattering of one of a said pair of intersecting said light beams; and calculating at least one pair of distances, each said distance being between a said surface location and a corresponding geometric reference location in a direction normal to said geometric plane generally defined by said surface, said calculating of each said distance including trigonometrically relating a said oblique angle and a said separation, each said distance being associated with the scattering of one of a said pair of intersecting said light beams.

2. The method of claim 1, wherein said trigonometrically relating includes equating the tangent of said oblique angle to the quotient represented by the division of said separation by said distance.

3. The method of claim 1 comprising performing sequentially at least twice the combination of steps including said generating, said measuring and said calculating.

4. The method of claim 3, wherein said surface is the surface of a fluid wave, wherein said method further comprises causing said fluid wave to be in motion, and wherein said performing sequentially yields at least two different values of each said distance of at least one said pair of said distances.

5. The method of claim 1, wherein:

said emitting at least one pair of intersecting said light beams includes emitting plural pairs of intersecting said light beams;

said measuring at least one pair of said separations includes measuring plural pairs of said separations;

said calculating at least one pair of said distances includes calculating plural pairs of said distances; and a sufficient plural number of said distances is calculated so as to be indicative of the shape of at least a portion of said surface.

6. The method of claim 1 further comprising calculating at least one slope of said surface, each said slope being taken at a location on said surface that is interposed between a pair of said surface locations, each said surface location being associated with the scattering of one of a said pair of intersecting said light beams, each said calculating of a said slope including trigonometrically relating a said oblique angle, a said pair of said separations, and a said pair of said distances.

7. The method of claim 6, wherein said trigonometrically relating includes equating said slope to a quotient, wherein the dividend of said quotient is the difference between said pair of distances, and wherein the divisor of said quotient is the product of the tangent of said oblique angle times the sum of said pair of distances.

8. The method of claim 6, wherein:

said emitting at least one pair of intersecting said light beams includes emitting plural pairs of intersecting said light beams;

said measuring at least one pair of said separations includes measuring plural pairs of said separations;

said calculating at least one pair of said distances includes calculating plural pairs of said distances;

said calculating at least one slope of said surface includes calculating plural said slopes; and a sufficient plural number of said slopes is calculated so as to be indicative of the shape of at least a portion of said surface.

9. The method of claim 8, wherein:

said method comprises performing sequentially at least twice the combination of steps including said generating, said measuring plural pairs and said calculating plural slopes;

said surface is the surface of a fluid wave:

said method further comprises causing said fluid wave to be in motion; and a sufficient plural number of said slopes is calculated so as to be indicative of at least one change in the shape of at least a portion of said surface.

10. Apparatus for determining at least one configurative characteristic of a surface, said apparatus comprising:

means for emitting at least one pair of intersecting light beams, each said light beam being disposed at an oblique angle with respect to a geometric normal to the geometric plane generally defined by said surface, each said light beam being scattered by said surface at a corresponding surface location, each said pair of intersecting said light beams striking said surface so that the corresponding said oblique angles are equal and oppositely disposed;

means for generating a photographic image, said photographic image containing at least two photographic forms, each said photographic form being associated with the scattering of a corresponding said light beam by said surface;

means for measuring at least one pair of separations, each said separation being between a photographic form and a corresponding photographic reference location in said photographic image, each said separation of said pair of separations being between a said photographic form and the same said reference location, each said photographic form being associated with the scattering of one of a said pair of intersecting said light beams; and means for calculating at least one pair of distances, each said distance being between a said surface location and a corresponding geometric reference location in a direction normal to said geometric plane generally defined by said surface, said calculating of each said distance including trigonometrically relating a said oblique angle and a said separation, each said distance being associated with the scattering of one of a said pair of intersecting said light beams.

11. The apparatus of claim 10, wherein said trigonometrically relating includes equating the tangent of said oblique angle to the quotient represented by the division of said separation by said distance.

12. The apparatus of claim 10, wherein:
said emitting at least one pair of intersecting said light beams includes emitting plural pairs of intersecting said light beams;
said measuring at least one pair of said separations includes measuring plural pairs of said separations;
said calculating at least one pair of said distances includes calculating plural pairs of said distances; and
a sufficient plural number of said distances is calculated so as to be indicative of the shape of at least a portion of said surface.

13. The apparatus of claim 10 further comprising means for calculating at least one slope of said surface, each said slope being taken at a location on said surface that is interposed between a pair of said surface locations, each said surface location being associated with the scattering of one of a said pair of intersecting said light beams, each said calculating of a said slope including trigonometrically relating a said oblique angle, a said pair of said separations, and a said pair of said distances.

14. The apparatus of claim 11, wherein said trigonometrically relating includes equating said slope to a quotient, wherein the dividend of said quotient is the difference between said pair of distances, and wherein the divisor of said quotient is the product of the tangent of said oblique angle times the sum of said pair of distances.

15. The apparatus of claim 11, wherein:
said emitting at least one pair of intersecting said light beams includes emitting plural pairs of intersecting said light beams;
said measuring at least one pair of said separations includes measuring plural pairs of said separations;
said calculating at least one pair of said distances includes calculating plural pairs of said distances;
said calculating at least one slope of said surface includes calculating plural said slopes; and
a sufficient plural number of said slopes is calculated so as to be indicative of the shape of at least a portion of said surface.

16. The apparatus of claim 10, wherein:
said means for emitting at least one pair of intersecting said light beams includes at least two lasers, each said light beam being emitted by a corresponding said laser;
said means for generating a photographic image includes a digital camera;
said means for measuring at least one pair of said separations includes means for processing said photographic image; and
said means for calculating at least one pair of said distances includes means for processing values pertaining to at least two said oblique angles, at least two said separations and at least two said distances.

17. Apparatus for evaluating the configuration of a surface, said apparatus comprising:
a pair of laser devices for projecting two laser beams crossing each other, each said laser device projecting a said laser beam upon a surface, said surface generally describing a geometric plane, said two laser beams each being oriented at the same acute angle relative to a geometric medial line that is perpendicular to said geometric plane;
a camera for photographing the scattering of said two laser beams by said surface, said camera creating an image including two separate image spots that respectively manifest two separate scatter locations, each said scatter location being a location on said surface at which a said laser beam is scattered by said surface, each said image spot being distanced from the associated said scatter location so that said image spot and the associated said scatter location lie in a geometric scatter line that is perpendicular to said geometric plane; and
computer means for determining the slope of said surface at a slope location, said slope location being a location on said surface that is between said two scatter locations, said determination of the slope including consideration of:
the respective orientations of said two laser beams relative to said geometric plane; and
the separation distance between said two image spots;
wherein said consideration of the separation distance between said two image spots includes consideration of the distance of each said image spot relative to said medial line.

18. The apparatus of claim 17, wherein:
said determination of the slope includes application of trigonometry in terms of two geometric triangles;
said two laser beams cross each other at a cross location, said cross location being a location on said geometric medial line that is distanced above said surface;
a first said geometric triangle has its vertices at said cross location, a first said scatter location, and a first medial perpendicularity location;
said first medial perpendicularity location is a location on said geometric medial line that is intersected by a geometric line that is perpendicular to said geometric medial line and that passes through said first scatter location;
a second said geometric triangle has its vertices at said cross location, a second said scatter location, and a second medial perpendicularity location; and
said second medial perpendicularity location is a location on said geometric medial line that is intersected by a geometric line that is perpendicular to said geometric medial line and that passes through said second scatter location.

19. The apparatus of claim 18, wherein:
in said first geometric triangle, the tangent of said acute angle equals a first quotient, wherein the dividend of said first quotient is the length of the geometric segment joining said first medial perpendicularity location and said first scatter location, and wherein the divisor of said first quotient is the length of the geometric segment joining said first medial perpendicularity location and said cross location; and
in said second geometric triangle, the tangent of said acute angle equals a second quotient, wherein the dividend of said second quotient is the length of the geometric segment joining said second medial perpendicularity location and said second scatter location, and wherein the divisor of said second quotient is the length of the geometric segment joining said second medial perpendicularity location and said cross location.

20. The apparatus of claim 18, wherein:
said slope location is the location on said surface that is intersected by said geometric medial line; and said geometric medial line is parallel to and between said scatter lines.

21. The apparatus of claim 18, wherein:

said pair of laser devices is a first pair of said laser devices:

said apparatus further comprises at least a second pair of said laser devices;

each said pair of laser devices is for projecting two laser beams crossing each other;

said computer means is for determining the slope of said surface at at least a second said slope location;

each said slope location corresponds to a different said pair of laser devices; and said camera is for instantaneously photographing the scattering by said surface of said two laser beams corresponding to every said pair of laser devices.

* * * * *